United States Patent [19] [11] Patent Number: 4,862,451
Closs et al. [45] Date of Patent: Aug. 29, 1989

[54] METHOD AND APPARATUS FOR SWITCHING INFORMATION BETWEEN CHANNELS FOR SYNCHRONOUS INFORMATION TRAFFIC AND ASYNCHRONOUS DATA PACKETS

[75] Inventors: Felix H. Closs, Adliswil; Johann R. Mueller, Langnau; Pitro A. Zafiropulo, Rueschlikon, all of Switzerland

[73] Assignee: International Business Machines Corporation, Armonk, N.Y.

[21] Appl. No.: 143,893

[22] Filed: Jan. 14, 1988

[30] Foreign Application Priority Data

Jan. 28, 1987 [CH] Switzerland .................... 101194/87

[51] Int. Cl.⁴ ............................................ H04Q 11/04
[52] U.S. Cl. ......................................... 370/60; 370/85
[58] Field of Search ............................ 370/60, 85, 94; 390/825.5

[56] References Cited

U.S. PATENT DOCUMENTS 4,445,213 4/1984 Bush et al. ........................ 370/60
4,456,989 6/1984 Johnson et al. ................... 370/60
4,644,529 2/1987 Amstutz et al. ................... 370/60
4,700,185 10/1987 Balph et al. ....................... 370/85
4,719,621 1/1988 May ................................... 370/85

FOREIGN PATENT DOCUMENTS 0054077 12/1980 European Pat. Off. .
0059149 2/1982 European Pat. Off. .

OTHER PUBLICATIONS

Goeldner, "An Integrated Circuit/Packet Switching Local Area Network–Performance Analysis and Comparison of Strategies", Computer Networks and ISDN Systems, vol. 10, No. 3/4, Oct./Nov. 1985, pp. 211–219.

Primary Examiner—Robert L. Griffin
Assistant Examiner—Frank M. Scutch, III
Attorney, Agent, or Firm—John C. Smith; M. H. Klitzman; S. A. Seinberg

[57] ABSTRACT

In a switching exchange for circuit-switched/synchronous traffic (CS) and packet-switched/asynchronous data packet traffic (PS), transmission lines communicate with FIFO buffers interconnected by a data bus on which information is transferred in periodic frames. CS traffic is collected in FIFO input buffers in minipackets each carrying a local routing address. The last minipacket per frame period is identified by a special end tag. Once per frame a daisy-chain signal propagates through access control lines to sequentially read out from FIFO input buffers all CS minipackets up to the next one having a special end tag, transferring them through the data bus to FIFO output buffers. Thereafter a token access mechanism starts enabling selective PS data packet transfer between FIFO input and output buffers. When a new frame begins, and PS data packet transfer is interrupted for a CS minipacket readout process, and thereafter transfer of the interrupted PS packet is resumed.

18 Claims, 10 Drawing Sheets

METHOD AND APPARATUS FOR SWITCHING INFORMATION BETWEEN CHANNELS FOR SYNCHRONOUS INFORMATION TRAFFIC AND ASYNCHRONOUS DATA PACKETS

BACKGROUND OF THE INVENTION

1. Technical Field

The present invention relates to switching exchanges, and in particular to a method for transferring information between channels carrying synchronous information traffic and channels carrying asynchronous data packet traffic, and to switching exchange apparatus for interconnecting communication lines carrying synchronous information traffic and communication lines carrying asynchronous data packets.

2. Background Art

In communications, there is an increasing interest for the transmission of various kinds of information such as computer data and voice signals over the same network. This requires facilities for integrated services. Among these, switches or exchanges are important which can transfer streams of information or data bursts between various lines or channels which are connected to such exchanges or network nodes. Various prior systems have been designed to handle different kinds of traffic in an integrated manner.

For example, in a publication by G. J. Coviello entitled "Integration of Circuit/Packet Switching by a SENET Concept", Proceedings of the National Telecommunications Conference NTC 1975, pp. 42-12 ... 42-17, a switching node is disclosed in which traffic of incoming lines is separated into two classes: Circuit-switched traffic and packet-switched traffic. One bus is provided for each class to allow separate switching; one bus transfers voice traffic into class I output queues, and the other bus transfers data packets by a packet processor into class II output queues. The Coviello publication provides no solution for the arbitration between input trunks for access to the bus for circuit-switched traffic.

European patent application No. 0,054,077 entitled "Method of Transmitting Information Between Stations Attached to a Unidirectional Transmission Ring", published in June 1982, describes a token ring communication system in which, besides irregular packets, also synchronous information can be transmitted by issuing a priority token in quasi-synchronous intervals. However, it has a problem in that the beginning of synchronous information transfer has to wait for the termination of any packet transmission in progress. The system is designed for locally interconnecting stations, and not as a switching node for interconnecting lines or trunks.

An article by T. Takeuchi et al., "An Experimental Synchronous Composite Packet Switching System", published in the Proceedings of the IEEE 1986 International Zurich Seminar on Digital Communications, pp. 149-153, describes a system for common handling of circuit-switched and packet-switched traffic. Multiple switch modules are interconnected by a high-speed ring. CS data from several channels are collected in composite packets which are sent from one module to another with an address. However, actual switching is done in these modules by slot interchange procedures usually found in TDM switching systems. Actual transfer of information over the ring is done in equal-length packets so that the composite CS packets as well as non-composite data packets must be partitioned into equal-length sections with additional sequence numbering. When circuit-switched calls are terminated, a rearrangement of all slots in the composite packets is necessary.

SUMMARY OF THE INVENTION

It is an object of this invention to handle synchronous or circuit-switched as well as asynchronous or packet-switched traffic in a single exchange apparatus and switching method.

It is a further object of this invention to rearrange finished or established connections in accordance with a flexible arbitration scheme.

It is yet another object of this invention to interrupt asynchronous packet transmission at the end of a preselected time frame.

It is still another object of this invention to require no ring transmission medium for data signal transfer.

These an other objects are accomplished by a switching exchange for circuit-switched synchronous traffic (CS) and packet-switched asynchronous data packet traffic (PS) wherein transmission lines communicate with FIFO buffers interconnected by a data bus on which information is transferred in periodic frames. CS traffic is collected in FIFO input buffers in minipackets each carrying a local routing address. The last minipacket per frame period is identified by a special end tag. Once per frame a daisy-chain signal propagates through access control lines to sequentially read out from FIFO input buffers all CS minipackets up to the next one having a special end tag, transferring them through the data bus to FIFO output buffers. Thereafter a token access mechanism starts enabling selective PS data packet transfer between FIFO input and output buffers. When a new frame begins, any PS data packet transfer is interrupted for a CS minipacket readout process, and thereafter transfer of the interrupted PS packet is resumed. An arbitration scheme allows flexible connection of input and output buffers.

BRIEF DESCRIPTION OF THE DRAWINGS

FIG. 9 is a timing diagram illustrating the assembling of minipackets, including local addresses and tags.

DESCRIPTION OF THE PREFERRED EMBODIMENT

It should be noted that the term "data" in the following description is intended to be used in its broader sense, including, actual data, addresses and error checking information. A distinction is made for the particular types of data, such as address data, when necessary.

Figure 1:
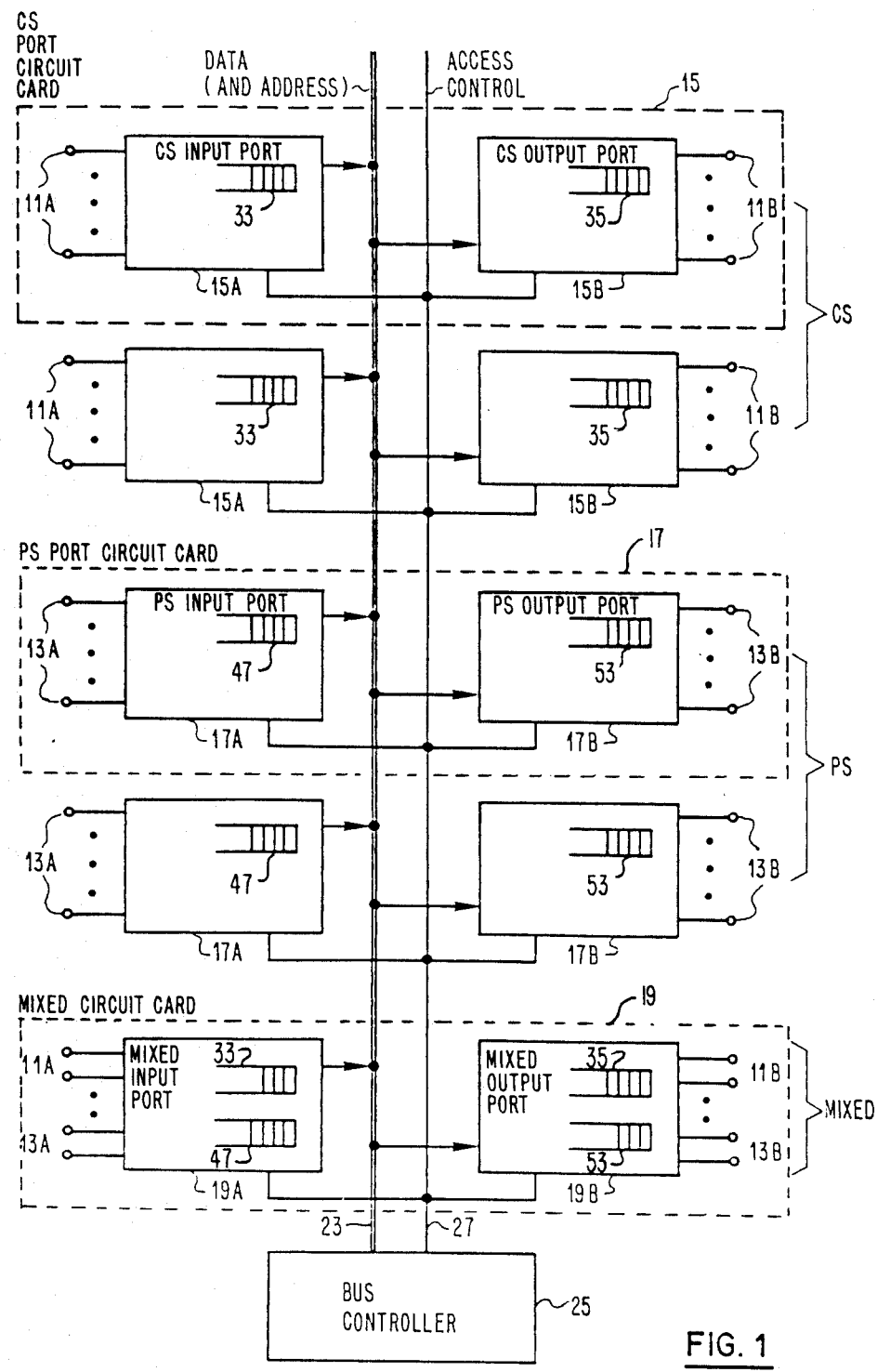
FIG. 1 is an overview of a switching exchange in which the present invention is used.

FIG. 1 is the basic outline of a switching exchange in which the invention is used. The exchange interconnects a multiplicity of communication lines (channels) 11A, 11B for circuit-switched (CS) data, and also lines 13A, 13B for packet switched (PS) data. Circuit-switched (CS) data is synchronous traffic (e.g. voice data). Packet switched (PS) data is asynchronous traffic (e.g., computer data). Incoming CS lines 11A are connected to CS input port units 15A, and outgoing CS lines 11B originate in CS output port units 15B. Similarly, incoming and outgoing PS lines 13A and 13B are connected to the exchange by PS input port units 17A and PS output port units 17B, respectively. Optionally, mixed input port units 19A can be connected to both CS input lines 11A and PS input lines 13A, and mixed output port units 19B can be connected to both CS output lines 11B and PS output lines 13B. For packaging purposes, a pair of input and output port units 15A and 15B are placed on one port circuit card 15, a pair of input and output port units 17A and 17B are placed on one port circuit card 17, and a pair of input and output port units 19A and 19B are placed on one port circuit card 19. Each of the port units for single traffic type 15A, 15B, 17A, 17B includes one first-in/first-out (FIFO) buffer 33, 35, 47, 53, in which the incoming or outgoing information is temporarily stored. Each of the mixed port units (19A, 19B) includes a pair of FIFO buffers 33, 35, 47, 53: One for the CS traffic, and one for the PS traffic.

Figure 2:
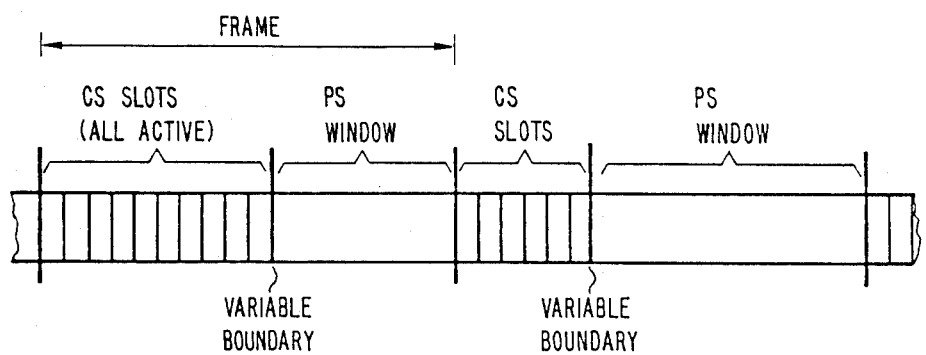
FIG. 2 shows the basic frame format for information transmission the data bus of FIG. 1.

Transfer of data from input ports to output ports is effected as follows in accordance with the invention: The bus controller 25 defines time frames on the bus which are of constant length. As shown in FIG. 2, each time frame is separated into a CS portion having CS time slots, and a PS window in which data packets of varying length are transmitted. The boundary between CS portion and PS window is variable, the length of the CS portion, (i.e., the number of CS slots), is equal to the number of presently active CS channels.

Figure 4:
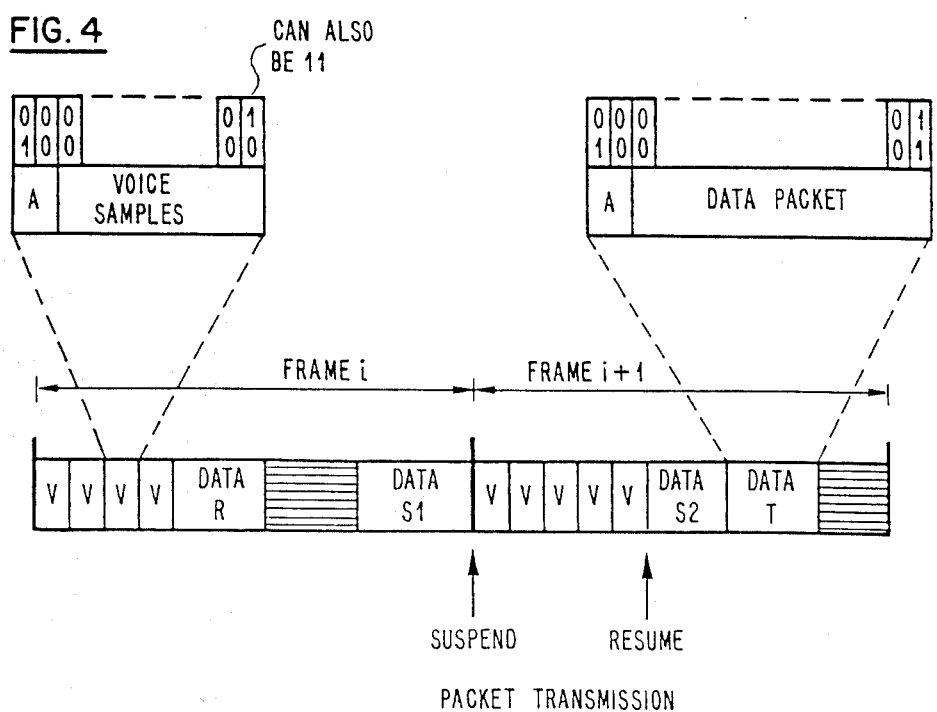
FIG. 4 is a detailed illustration of the frame format on the data bus.

FIG. 4 illustrates the contents of two consecutive frames i and i+1 on the data bus. As can be seen, the first portion of each frame always contains a train of CS slots (V), each slot carrying one minipacket. Each CS slot (V) includes a local routing address (A) and voice sample data. The number of slots adapts to the number of presently active CS channels. A short gap (e.g., equal to one slot time) may appear after each group of CS slots from one FIFO buffer 33, to allow for switching from one input port unit to the next (daisy-chain forwarding) during the packet readout procedure. Packets are transferred in the PS window as they become available. As can be seen, a whole packet transfer may fit into one PS window, or it may be necessary to interrupt one packet transfer at the end of a frame and resume the suspended transfer after the CS slots of the next frame. There may also be idling portions in the PS windows if no packets are ready for transfer.

In the present example, each local routing address consists of two bytes, one for the output port unit 15B, and the other one for the output line 11B (Some of the two-byte local routing addresses could also be broadcast or group selection addresses). The CS data (or voice sample) section of each minipacket holds several bytes (e.g., eight voice samples). Any number of bytes can of course be selected for the address and for the data section, depending on the application for which the respective exchange is used. Optionally, a control byte appended to each minipacket (together with the local routing address bytes) will enable the selection of specific functions within the exchange, such as priority handling or the like.

Referring again to FIG. 1, all port units are interconnected by a data and address bus 23 (hereafter data bus). A bus controller 25 is provided which controls the readout of information (CS samples or PS data packets) from the input port units for their transfer to the destination output port units. For this purpose, bus controller 25 is connected to all port units by access control lines 27, and is also connected to the data bus 23.

Under control of the bus controller 25, all CS FIFO buffers 33 of input port units 15A are selected sequentially once during each frame period, and all minipackets of each FIFO buffer 33 which arrived during the last frame period are read out to the data bus. The output port units 15B accept the minipackets according to their local routing address (A, first part), and place them in the CS FIFO buffer 35 from where they are read out and gated to the proper CS output line 11B as determined by the second part of the minipacket's local routing address (A, second part). At the end of the CS portion of each frame, an access mechanism is started for the PS input port units 17A (or mixed input port units 19A) by which access to the data bus 23 is granted to one of them for transmitting a data packet in the PS window of the frame. If at the end of one packet transmission, time is left in the PS window, the access procedure is resumed and another packet transmission can be started.

Figure 3:
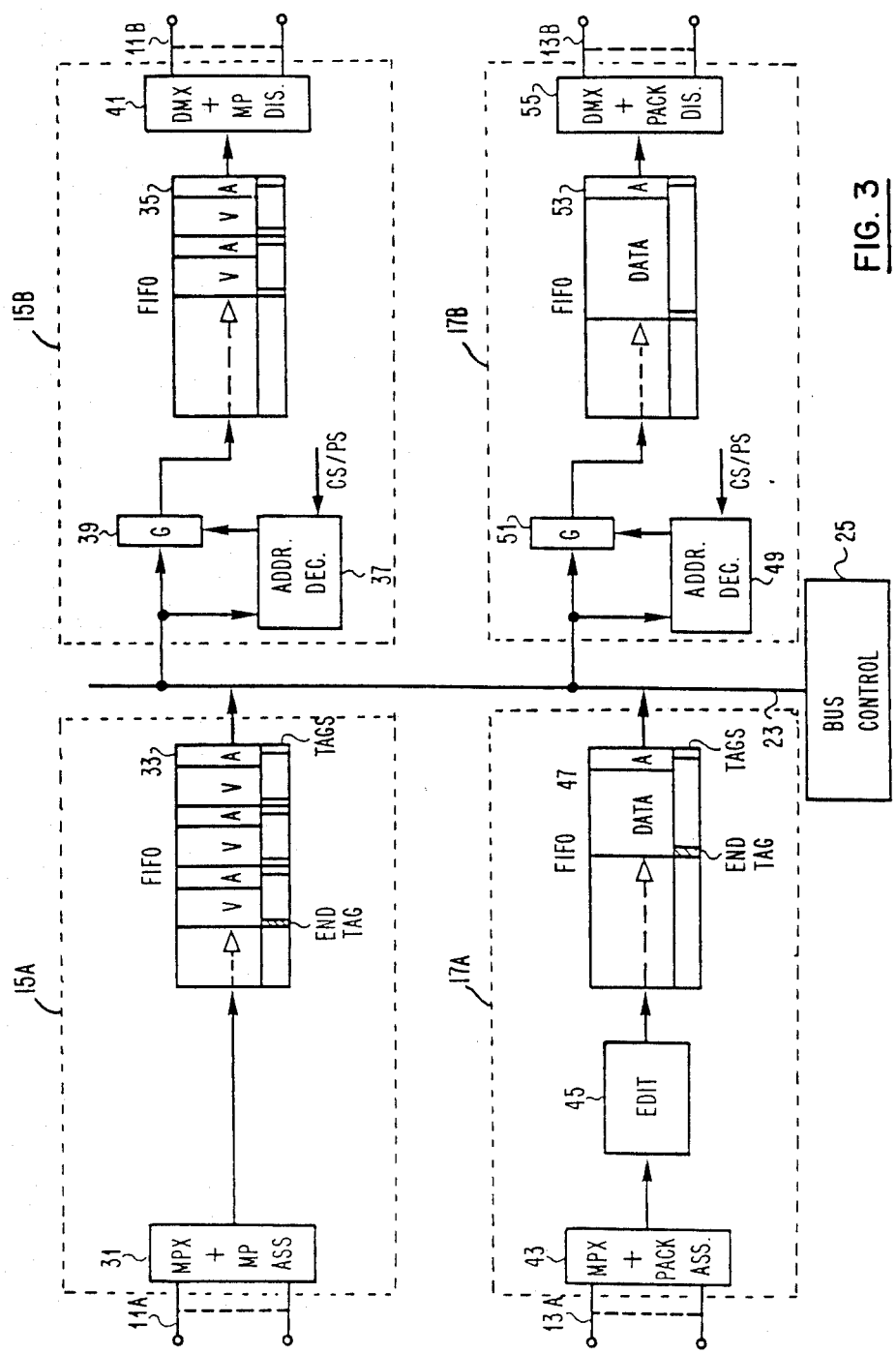
FIG. 3 illustrates details of buffering in the FIFO buffers of FIG. 1.

As shown in FIG. 3, each CS input port unit 15A comprises a multiplexer and assembly unit 31 to which a plurality of CS input lines 11A are connected, and one FIFO buffer 33. The assembly unit 31 collects the CS data (voice samples) arriving on each line 11A separately, and at the end of each frame period, it attaches the correct local routing address to the sequence of CS bytes (voice samples) and transfers each such sequence as a minipacket into the associated FIFO buffer 33. The minipackets are stored in parallel byte format (i.e., each row of the FIFO buffer 33 stores in parallel the eight bits of one byte, plus a two-bit tag which is attached to each byte in the assembly unit). These tags serve for identifying start and end of each minipacket (as will be explained later), and in particular, one of the tags is an end tag which designates the end of the last minipacket of each minipacket group belonging to one frame period.

Each CS output port unit 15B includes, besides a FIFO buffer 35 which is identical to the FIFO buffer 33 in the input port unit 15A, an address decoder 37 and a gating circuit 39. The address decoder 37 can recognize, besides its own unit's local address, a minipacket start tag (identifying a first local address byte), and a minipacket end tag. The address decoder 37 also receives a CS/PS control signal by which it is only enabled during the CS portion of each frame. The CS output port unit 15B further includes a demultiplexer/disassembler unit 41 which extracts minipackets from the associated FIFO buffer 35 and distributes the samples to the CS output lines 11B, depending on the local routing address found with the minipacket, and in correct timing as required for each of the CS output channels. Local routing address bytes and all two-bit tags are eliminated in the demultiplexer/disassembler.

CS data or voice samples (hereafter CS data) which are incoming on the CS lines 11A are assembled into minipackets in the respective input port unit 15A, and a local routing address is attached to each minipacket. This address designates the output port unit 15B and the respective outgoing CS line 11B for the information (data bytes or voice samples) of the respective minipacket. Minipackets are stored sequentially in the CS FIFO buffer 33 of the respective input port unit 15A. Each minipacket holds only samples of one CS channel (i.e., samples having the same destination).

It should be noted here that for the present example, it was assumed that all minipackets have the same length, (i.e., the slots in the CS portion of each frame are all equal). If different transmission speeds are used on the different CS transmission lines 11A, the following is possible:

(a) the assembly unit 31 generates uniform CS minipackets. This will result in the following situation: for a fast line, four minipackets will be generated in each frame period; for a medium line, only one minipacket will be formed per frame; and for a slow line, a minipacket will only be completed in every second frame period. The FIFO buffer readout mechanism described will easily handle this situation.

(b) The assembly unit 31 generates one and only one minipacket per input line in each frame period, but the minipacket length corresponds to the respective line speed. Also this situation is easily handled by the described readout and minipacket transfer mechanism.

If an incoming CS line 11A carries multiplexed traffic from several CS channels, traffic is transferred via group switching. In group switching, data from several CS channels is included in the same minipacket and transferred on the same output of the exchange. Otherwise, for each channel a separate minipacket with an individual local routing address would have to be generated. For purposes of simplifying the description, each CS input line 11A is shown and described as carrying only one channel (i.e., is not time-division multiplexed), although in actual application each CS input line carries more than one channel.

PS input port units 17A are similar to the CS input port units 15A, except for the assembling of minipackets. Each PS input port unit comprises a multiplexer and packet assembler 43 to which several PS transmission lines 13A are connected, and which has one output connected to a packet editor 45 which in turn is connected to the input of the PS FIFO buffer 47. Each packet which arrives on an incoming PS line 13A is first assembled in a packet assembler 43 and then stored in the PS FIFO buffer 47 of the respective input port unit 17A, after attaching a local routing address to it. Whenever a complete packet is available for switching, the packet assembler 43 sends a ready signal and then the assembled packet to the packet editor 45. A local routing address (two bytes in present example) is derived from the packet system destination address and is appended to the received packet during its transfer to the FIFO buffer 47. The data packet as received, including the system destination address, source address, error checking characters, etc., is not changed. Each byte of the packet plus the two local routing address bytes, is extended by a two-bit tag, as was explained already for the CS minipackets. This is also achieved by the packet editor 45 during transfer of the packet to the FIFO buffer 47.

PS output port units 17B are very similar to the CS output port units 15B. They also contain an address decoder 49 (which can recognize the local routing address of that unit, as well as a packet start tag and two different end tags), a gating circuit 51, a FIFO buffer 53, and a demultiplexer/packet disassembler 55 connected to several PS output lines 13B. Address decoder 49 also receives a CS/PS control signal by which it is enabled only during the PS window of each frame. The demultiplexer/packet disassembler reads out available packets from the FIFO buffer 53 and gates each packet to the correct output line 13B, as indicated by the second local routing address byte accompanying the packet. The local address bytes and the two-bit tags are of course stripped off before the packet is released on a transmission line.

If a packet has not finished transmission at the end of a frame, the PS transmission is interrupted with the next byte to allow immediate starting of CS FIFO buffer readout for CS minipacket transfer. At the end of the CS portion, after serving all CS FIFO buffers 33 once, the net PS window starts and the transmission of the interrupted packet is resumed. At the end of the transfer of the interrupted packet, the access mechanism is started again if there is still some time left in the respective PS window. Address decoder 49, when receiving an intermediate end tag (issued when a packet is interrupted), disables gating circuit 51 but is kept in a wait state. When the address decoder 49, being in wait state, receives another start tag during a PS window, it enables gating circuit 51 again until it receives the final end tag of the respective packet.

FIG. 3 illustrates how CS minipackets and PS data packets are stored in the FIFO buffers 33, 35, 47, 53, and how they are extracted from the data bus 23. For ease of illustration, this figure shows only one CS input port unit 15A, one CS output port unit 15B, one PS input port unit 17A, and one CS output port unit 17B. Each FIFO buffer 33 holds in sequential order for each minipacket group, the address (A) of the first minipacket (2 bytes), then the data section of the first minipacket (several bytes), immediately thereafter the address of the second minipacket, followed by the data section of the second minipacket, and so on. The last data byte of the last minipacket of one group holds the end tag. One advantage of this design is that minipackets of the next group, (those belonging to the following frame), can be stored immediately after the minipackets of the previous group, because readout is effected only up to the end tag in one readout operation. If the connection in one channel is terminated in a frame period, or if a new connection is established, no adaptation is required with respect to the FIFO buffers and their readout mechanism.

When a minipacket group is read out from a CS FIFO buffer 33, the bytes appear sequentially on the data bus 23. Each address decoder 37 looks for a first local address byte to appear on the bus (recognizable by the unique start tag), and if the respective address byte corresponds to the address of the respective output port unit, the whole minipacket (up to a minipacket end tag) is gated into the associated CS FIFO buffer 35. Thus, the minipackets of one group are correctly distributed to their intended destination output units.

When a PS input port unit 17A is selected for a packet transfer, the respective FIFO buffer 47 is read out to the data bus 23 until the byte with the packet end tag appears. The address decoders 49 in PS output port units 17B detect any first local address byte appearing on the data bus 23, and if the local routing address corresponds to the unit's address, the whole packet up to the packet end tag is then gated to the associated PS FIFO buffer 53.

For ease of understanding, detailed explanations of the various functions of the present invention will be discussed separately below:

1. BUS SYSTEM AND ACCESS CONTROLS

Figure 5:
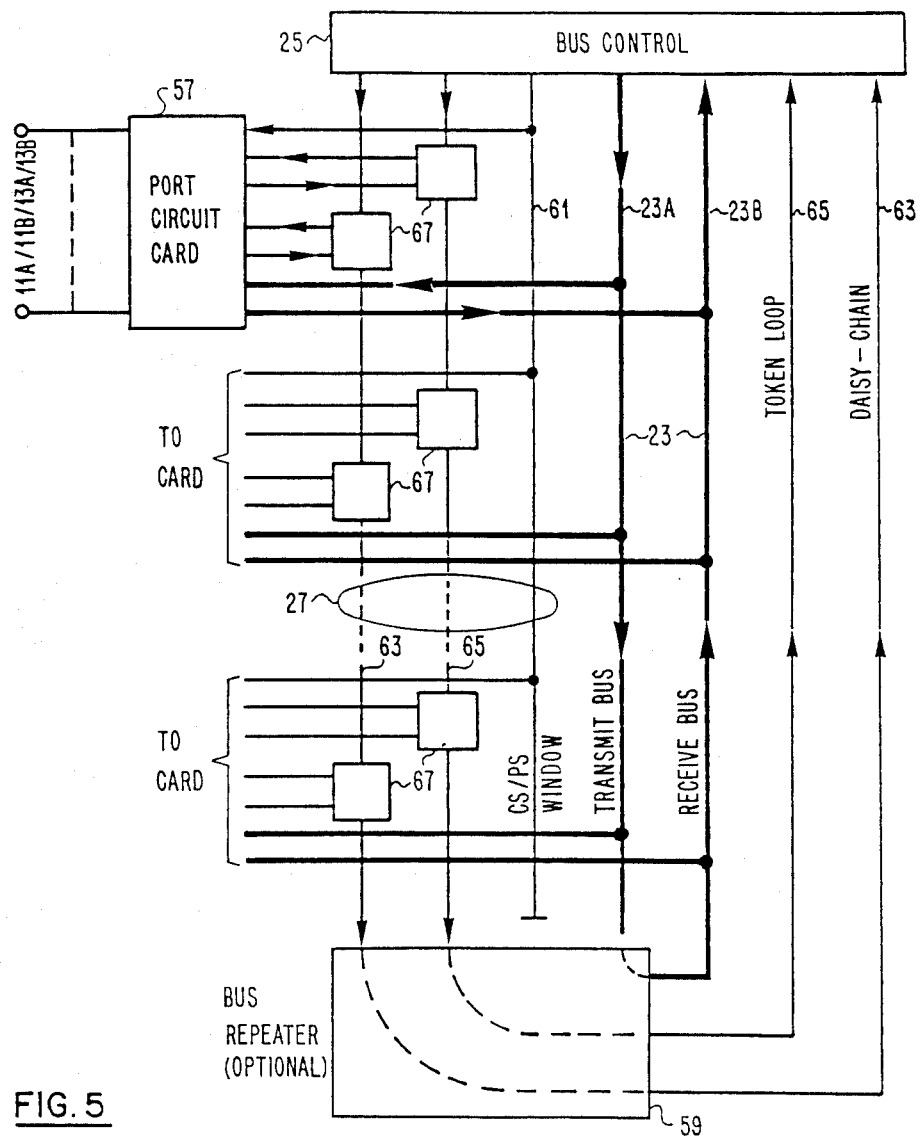
FIG. 5 is a schematic representation of the bus system in the exchange of FIG. 1, including data bus and access control lines.

FIG. 5 depicts the bus system and access control lines for the present embodiment of the invention. In the figure there can be seen the bus controller 25, one port circuit card 57 (which is exemplary for a plurality of similar cards), the data bus 23, access control lines 27, and an optional bus repeater 59. Each of the port circuit cards 57 may either contain one pair of port units (e.g., 15A and 15B) or a group of such port unit pairs. The data bus lines and access control lines connected to the respective port circuit card are internally connected to each of the individual port units, as required.

The data bus 23 is split into two portions, a transmit bus 23A and a receive bus 23B. Each bus consists of 10 parallel electrical wire bit lines, for carrying the eight bits of each minipacket/data packet byte transmitted, plus the two appended tag bits. Instead of a separate transmit and receive data bus 23A, 23B, of course a single bidirectional data bus 23 could be used as is generally shown in FIG. 1, but the split bus allows faster operation.

The access control lines are actually one bus line 61 and two loop lines 63, 65 originating in the bus controller 25, going through each connected port unit, and returning back to the bus controller 25. The three different access control lines are:

(a) A CS/PS window indicator bus line 61. The binary signal on this line indicates the present status of the frame on the data bus, i.e., whether currently a CS slot transmission is active, or whether the PS window is open.

Figure 6:
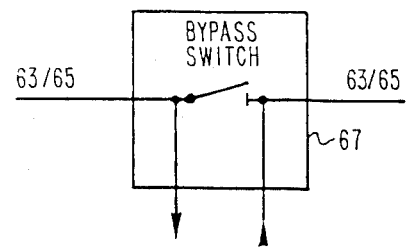
FIG. 6 shows the bypass/insert switch used in the access control lines of the bus system in FIG. 5.

(b) A CS access control line 63. This is a loop line or daisy-chain line for selecting sequentially, during the CS slot portion of each frame, all CS FIFO buffers 33 in CS input port units 15A and in mixed input port units 19A. This line is connected to each port unit card by an insert/bypass switch 67 which is shown in detail in FIG. 6. Without an attached port unit card, the respective switch 67 bypasses that location, (i.e., the loop line is then not interrupted at the switch). When any port unit card is activated, the bypass switch is opened and the input port units on the respective card which have CS FIFO buffers 33 are inserted into the loop.

(c) A PS access control line 65. This line is a token loop line for transferring a token which grants access to the data bus for packet transfer during the PS window of a frame. This loop line is also connected to the port unit cards by insert/bypass switches 67, so that a location can either be bypassed, or the token ring line is opened and all input port units of the respective card having PS FIFO buffers 47 are inserted into the loop line. Operation of the token arbitration mechanism will also be explained later.

Figure 7:
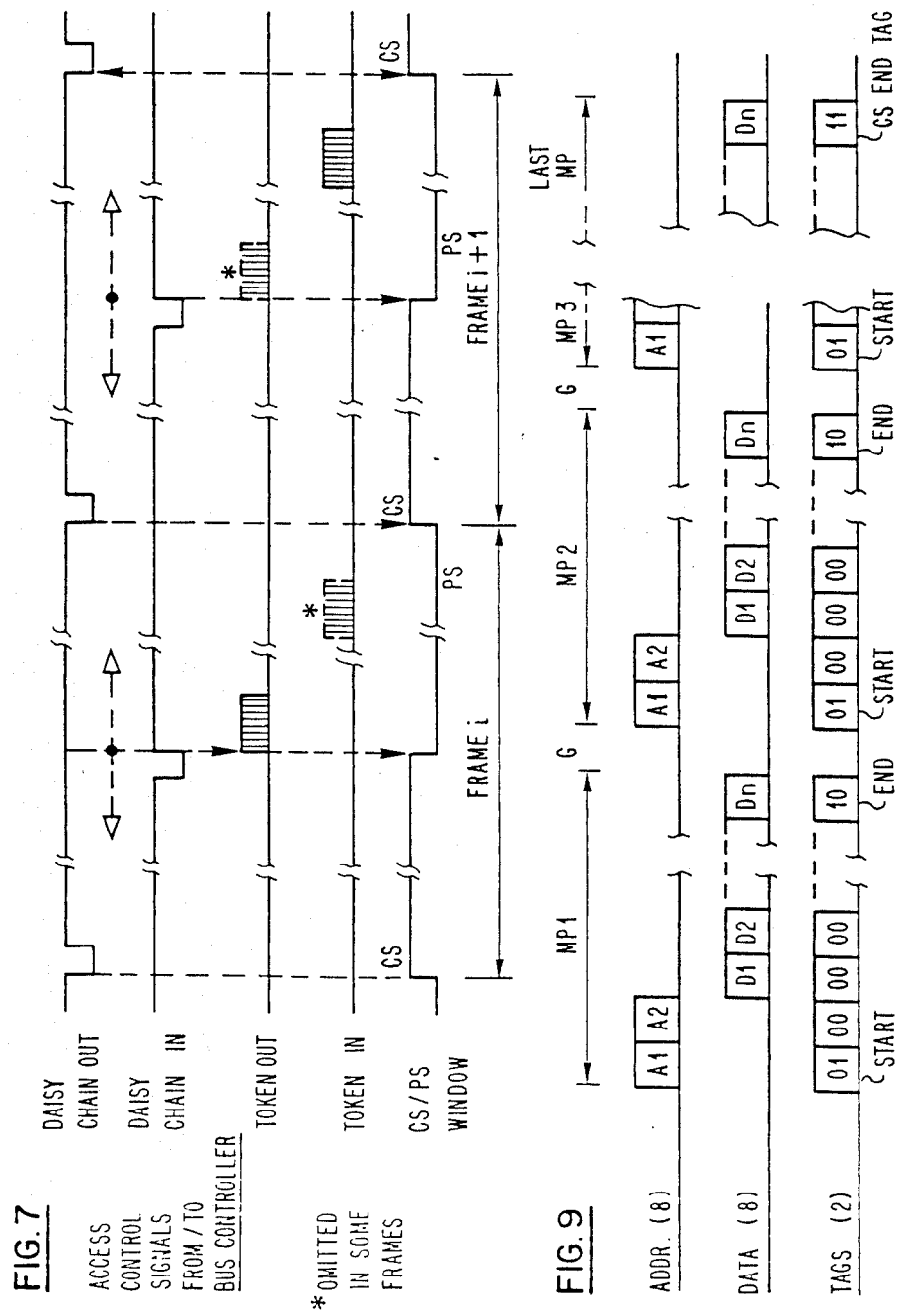
FIG. 7 shows the timing and control signals at the interface between the bus controller and the access control lines.

A timing diagram of the signals on these three access control lines, as they leave or enter, respectively, the bus controller 25, is shown in FIG. 7. At the beginning of a frame period, the bus controller 25 issues a short pulse on the daisy-chain line 63. This will cause read-out of the first CS FIFO buffer. The pulse is passed on through all CS input port units and finally returns from the last CS input port unit on the loop to the bus controller 25. This ends the CS slot portion of the frame. The PS window is then started by the bus controller 25, by releasing a token which is a particular bit sequence on the token loop line and by changing the CS/PS window indicator signal on line 61 to indicate that the PS window is active. The token passes through the PS input port units and is seized by any such unit which has a data packet ready for transmission. The token is released by the respective PS input port unit after the packet transmission, for further propagation on the token loop line 65, and may finally return to the bus controller 25 in the same frame period. However, if a packet transmission is not finished before the start time of the next frame period, that transmission will be suspended, the token will be kept by the respective PS input port unit and thus will not return to the bus controller in that frame.

The CS transmission portion of the new frame starts by releasing another daisy-chain pulse from the bus controller and by changing the CS/PS window indicator signal to indicate that CS transmission is in progress. Another cycle of CS FIFO buffer readout operations is then executed.

At the beginning of the next PS window (i.e., when the daisy-chain pulse returns to the bus controller 25), the bus controller 25 will switch the CS/PS window indicator signal on access control line 61 to indicate that the PS window is active, but it will release a token only if in the last frame period, a token returned to it. Otherwise, the interrupted packet transmission will be resumed by the interrupted PS input port unit, which will release the token on loop line 65 later, after the packet transmission ends. To restate: The CS/PS window indicator signal, and the outgoing daisy-chain pulse are periodic signals, whereas timing of the other three signals depends on the number of active CS channels (daisy-chain incoming pulse and outgoing token) and on the packet traffic (outgoing token and incoming token).

When data is concurrently arriving on multiple lines, arbitration is necessary to determine when a line will transfer data. Alternative solutions are of course possible for the arbitration schemes. The daisy-chain signal could be a DC level signal instead of a pulse signal. The token for PS arbitration could be a single-bit token instead of a multiple-bit token. If a multiple-bit token is used as shown for above example, one could also include address information or priority information in the token. Furthermore, the same arbitration scheme could be used for the CS and PS switching procedures (either a daisy-chain scheme for both, or a token mechanism for both, or any other suitable access control scheme).

Clock signals are of course transferred from the bus controller 25 to all port units 15A, 15B, 17A, 17B, 19A, 19B, for synchronizing the bit transfers on the data bus. No details are shown because such clocking is well known in the art. It should be noted that when the data bus lines 23 and the clock lines are installed as parallel lines, the data delay and clock signal delay would always be the same for any one port unit attached to the data bus 23 and the clock lines.

2. ASSEMBLY UNIT IN CS INPUT PORT UNIT

Figure 8:
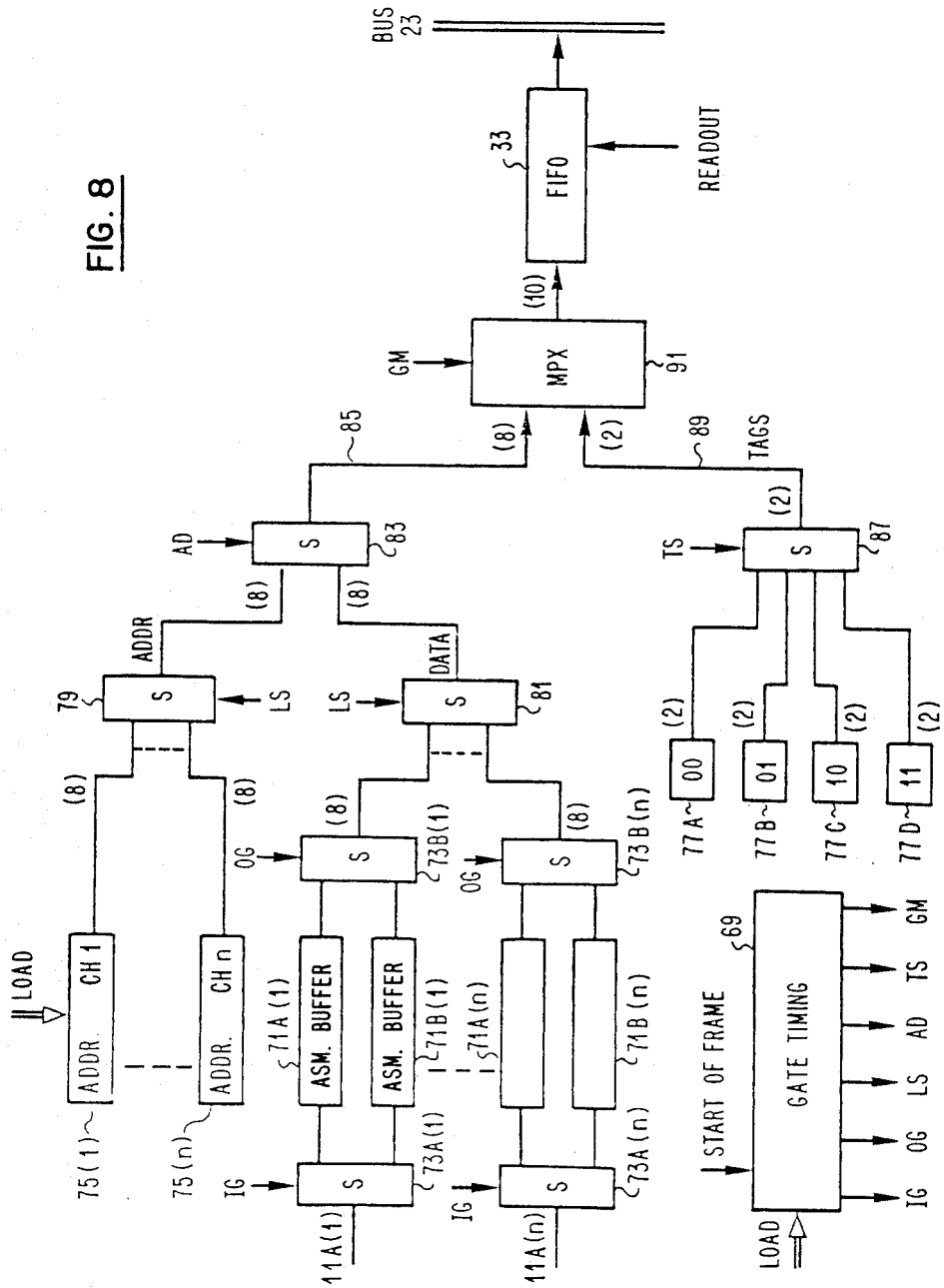
FIG. 8 is a block diagram of the circuitry for the assembly of minipackets.

FIG. 8 is a block diagram of the assembly unit 31 which is provided in each CS input port unit 15A (shown in FIG. 1) and in each mixed input port unit 19A for assembling minipackets including local routing addresses, and for appending a two-bit tag to each byte. For each of the input lines (channels) 11A(1) to 11A(n), a pair of assembly buffers 71A/71B is provided which are selected alternatingly for writing and reading by selector switches 73A and 73B. During one frame cycle, one of the buffers collects the CS data bits or voice samples arriving on the line, while the other buffer is read out. (For analog input lines, digital voice samples are produced by well-known A/D conversion.) Further provided are local routing address registers 75(l) to 75(n). For each connection that exists, a local routing address is held in the address register associated with the respective input line (channel). Furthermore, there are four two-bit tag registers 77A, 77B, 77C and 77D for holding the tags 00, 01, 10 and 11.

Selector circuits 79, 81 and 83 are provided for selecting either one of the address registers 75 or one of the buffer pairs 71A/B as a source for data on the eight parallel bit lines 85. Another selector circuit 87 is provided for selecting one of the four tag registers 77A/B/C/D as source for data on the two parallel bit lines 89. The data of lines 85 and 89 are combined in gating multiplexer 91 to form a ten-bit input to the FIFO buffer 33 of the respective CS input port unit 15A (shown in FIG. 1). Gate timing means 69 furnishes control signals to the selector and multiplexing/gating circuits so that in a readout cycle for the respective CS input port unit, for each active input line first two address bytes and then all CS data bytes (voice samples) collected during one frame period are transferred to the FIFO buffer 33, with two appropriate tag bits attached to each byte.

Table 1 given below illustrates the sequence of control signals which are issued by gate timing means 69.

can be easily adapted by changing the respective gating signals only for the line time period involved. But the CS end tag (3 in the table) must be given in the time interval of the last active input line.

FIG. 9 is a timing diagram illustrating the assembling of minipackets in the FIFO buffer 33. Each block designated A(i) is one local routing address byte, and each block designated D(n) is one CS data byte/voice sample. The two-bit tags attached to each byte have the following meaning:

00 = Normal address byte or data byte
01 = Start of minipacket (first address byte)
10 = End of normal minipacket (last data byte)
11 = End of last minipacket in a train of minipackets belonging to one frame period = CS end tag To simplify the description, only the assembling of minipackets of uniform length and for equal-speed input lines are described here. As was indicated earlier, the described assembly scheme handles traffic of input lines with different speeds. If equal-size minipackets are used, the timing signals cause emptying of the higher-speed line input buffers 71A, 71B in each frame period, whereas the lower-speed line input buffers 71A, 71B empty only every second or fourth frame period. Alternatively, if all input buffers are read out in each frame cycle, the minipackets assembling in the input buffers 71A, 71B are automatically shorter for slower input lines and longer for input lines with higher speed.

3. FIFO BUFFER READOUT CONTROL IN A CS INPUT PORT UNIT

Figure 10:
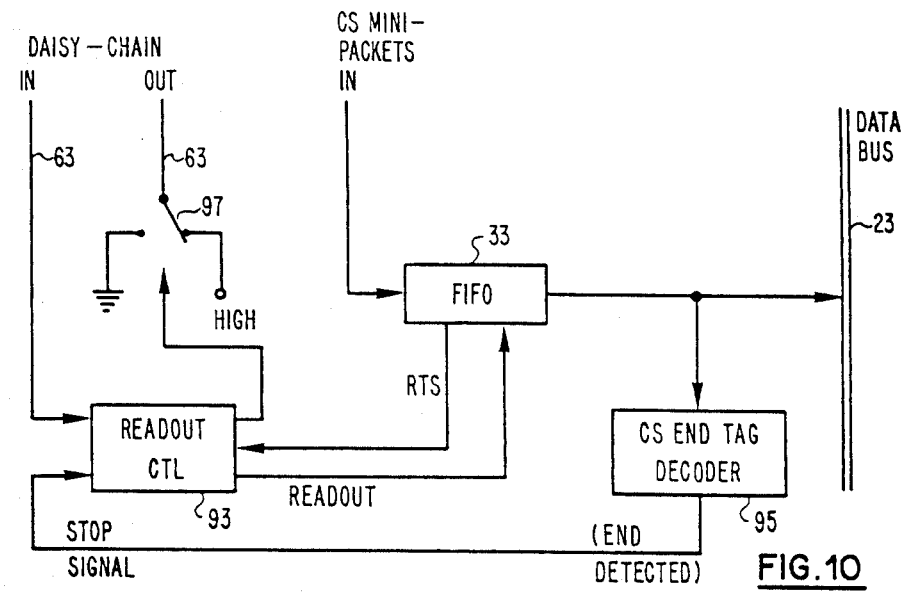
FIG. 10 is a block diagram of the circuitry for readout of minipackets from FIFO buffers.

FIG. 10 shows the circuitry by which the readout of a CS input FIFO buffer 33 is controlled once in each frame period in response to the daisy-chain signal on the CS access control line 63. It comprises readout control means 93, a CS end tag decoder 95, and a switch 97 for applying a select pulse to the outgoing daisy-chain line 63. Inputs of the readout control means 93 are connected to the incoming daisy chain line 63 and to the output of the CS end tag decoder 95. Output control lines of the readout control means are connected to the switch 97 and to the readout control input of the FIFO buffer 33. Input of the CS end tag decoder is connected

TABLE 1

| | Gating Signals in the Circuitry of FIG. 8 | |
|---|---|---|
| | Frame i | Frame (i+1) |
| IG | 0------------------0 | 1---------------1 0---- |
| OG | 1------------------1 | 0---------------0 1---- |
| LS | 0------01------12-- 7------7 | 0------01-- 7------7 1---- |
| AD | 0 0 1----1 0 0 1----1 0 0 1 | 0 0 1----1 0 0 1----1 0 0 1 0 0 1----1 0 0 1-- |
| TS | 1 0----0 2 1 0----0 2 1 0- | 1 0----0 3 1 0----0 2 1 0- 1 0----0 3 1 0--- |
| GM | 1------------------1 | 1---------------1 1---- |
| GM' | 1------------------1 | 0------01-- ---------1 0---- |

IG = In Gate   OG = Out Gate (0=upper / 1=lower)
LS = Line Select (for lines 0 . . . 7)
AD = Select Address or Data (0=Address / 1=Data)
TS = Tag Select (0=Norm / 1=Start / 2=MP End / 3=CS End)
GM = Gate Multiplexer The lines GM and GM' in this table show how the present invention adapts to changing traffic conditions. With signal GM, all input lines are active; therefore, the gating multiplexer 91 is opened for all line intervals (i.e., during the whole frame period). With signal GM', the connection on line 0 is cancelled at the end of frame i; therefore, gating multiplexer 91 is closed during the time interval for line 0, beginning with frame (i+1). Nothing is transferred into the FIFO buffer 33 during this time, but no gap will occur when the FIFO buffer 33 is finally read out. Thus, no slot rearrangement is necessary. Similarly, interval times for the various lines to the output line of the FIFO buffer 33.

Figure 11:
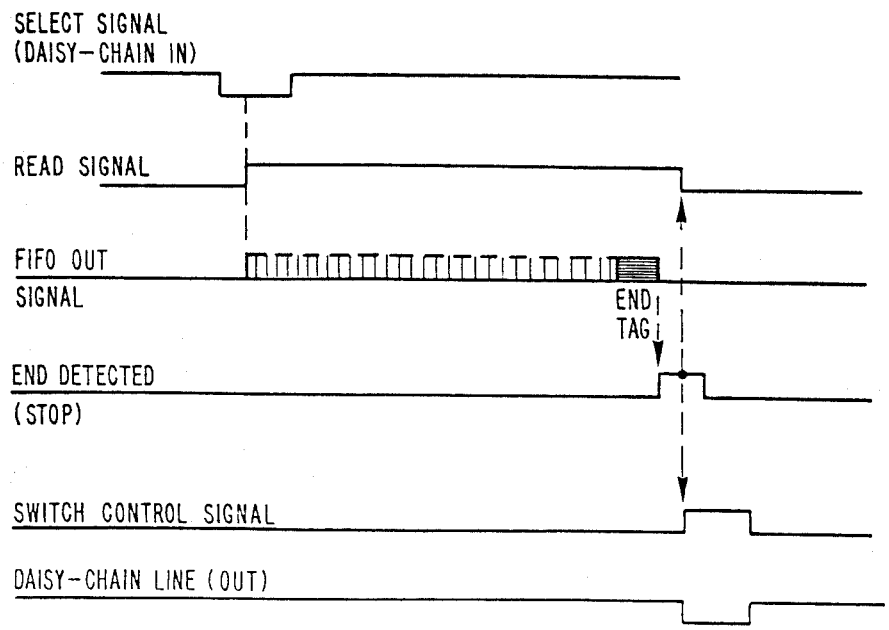
FIG. 11 is a timing diagram illustrating the readout of minipackets from FIFO buffers.

Operation of this circuitry is explained with reference to the timing diagram of FIG. 11. When a select pulse is received from the preceding CS input port unit on daisy-chain line 63, readout control means 93 raises the readout control signal on its output line so that address and data bytes are sequentially read out from the FIFO buffer 33 to the data bus 23. As soon as a CS end tag (11) is detected (i.e., when all minipackets belonging to one frame period were transferred to the data bus), a stop signal is sent to the readout control means 93 which thereupon stops the readout signal and causes the switch 97 to send a short select pulse on the daisy chain line 63 to the next CS input port unit 15A.

4. PS DATA PACKET EDITING

Figure 12:
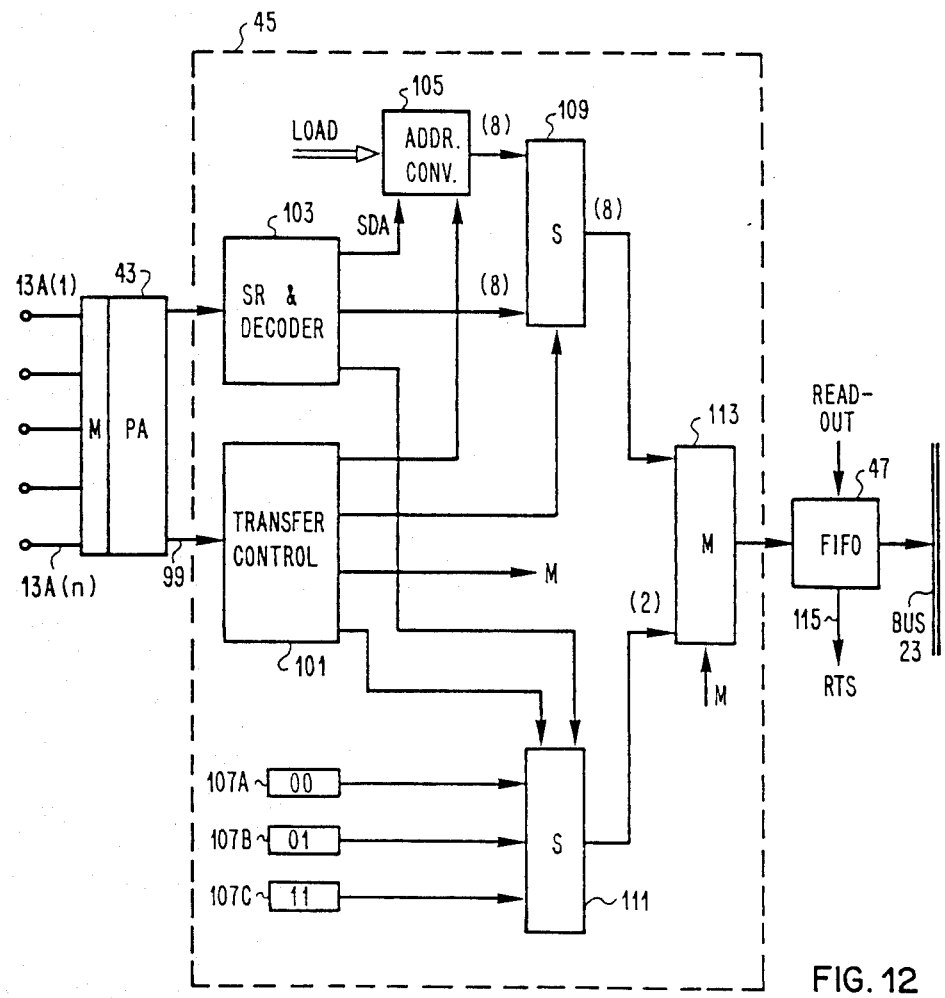
FIG. 12 is a block diagram of the circuitry for editing PS data packets.

FIG. 12 is a block diagram of the circuitry for editing data packets which were received on PS input lines 13A. The multiplexer and packet assembler 43 and FIFO buffer 47 were described previously in connection with FIG. 3. Data packets arriving are stored sequentially in the packet assembler without any change, including destination and source addresses and check bytes.

Packet editing circuitry 45 comprises transfer control means 101 which receives the "Packet Ready" signal on line 99 from packet assembler 43, and issues control signals to the other units. A shift register and decoder unit 103 is provided in the data path between packet assembler 43 and FIFO buffer 47. It recognizes and transfers a packet's system destination address (SDA) to address conversion circuitry 105, and it recognizes a packet's end. Address conversion circuitry 105 has a stored address conversion table and can issue in response to a packet's SDA the correct local routing address bytes.

Three two-bit registers 107A, 107B, 107C are provided for storing the tags 00 (normal byte), 01 (packet start/restart), and 11 (packet end). Furthermore, two selector circuits 109 and 111 and a multiplexing/gating circuit 113 are provided. They are controlled by signals from the transfer control means 101.

Figure 13:
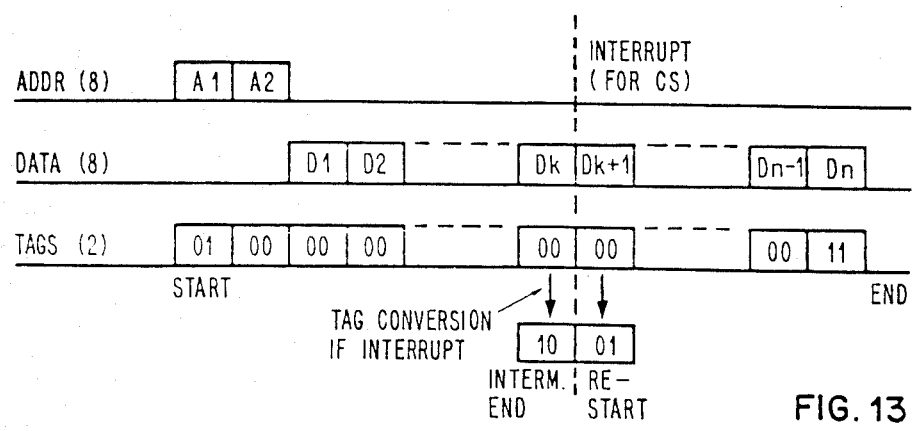
FIG. 13 is a timing diagram illustrating the editing and transfer of PS data packets.

Operation of the packet editing circuitry is explained with reference to the timing diagram of FIG. 13. The tags used for packet transfer have the following meaning:

- 00 = Normal packet byte or second local address byte.
- 01 = Start of a packet transfer (first local routing address byte) or restart of a packet transfer.
- 10 = Intermediate end of a packet transfer (interruption for CS transfer in a new frame). The intermediate end tag (10) is only used in the PS FIFO readout circuitry.
- 11 = Final end of a packet transfer.

When a packet is transferred from packet assembler 43 to FIFO buffer 47, two local routing address bytes are first gated into the FIFO buffer 47 through selector 109 and multiplexer 113. Simultaneously, a start tag (01) and a normal tag (00) are appended to the first and second local address byte, respectively. Thereafter, all packet bytes are transferred through selector 109 and multiplexer 113, appending a normal tag (00) to each byte. When the end of a packet was recognized, an end tag (11) is appended to the last byte of the packet. Delay of the shift register/decoder 103 and control signals of transfer control means 101 are so selected that the beginning of the data packet (i.e., its SDA), will immediately follow the second local routing address byte, and that the end tag is correctly appended to the last packet byte. When a complete packet is available in the FIFO buffer 47, a request-to-send signal (RTS) is active on line 115.

5. FIFO BUFFER READOUT CONTROL IN A PS INPUT PORT UNIT

Figure 14:
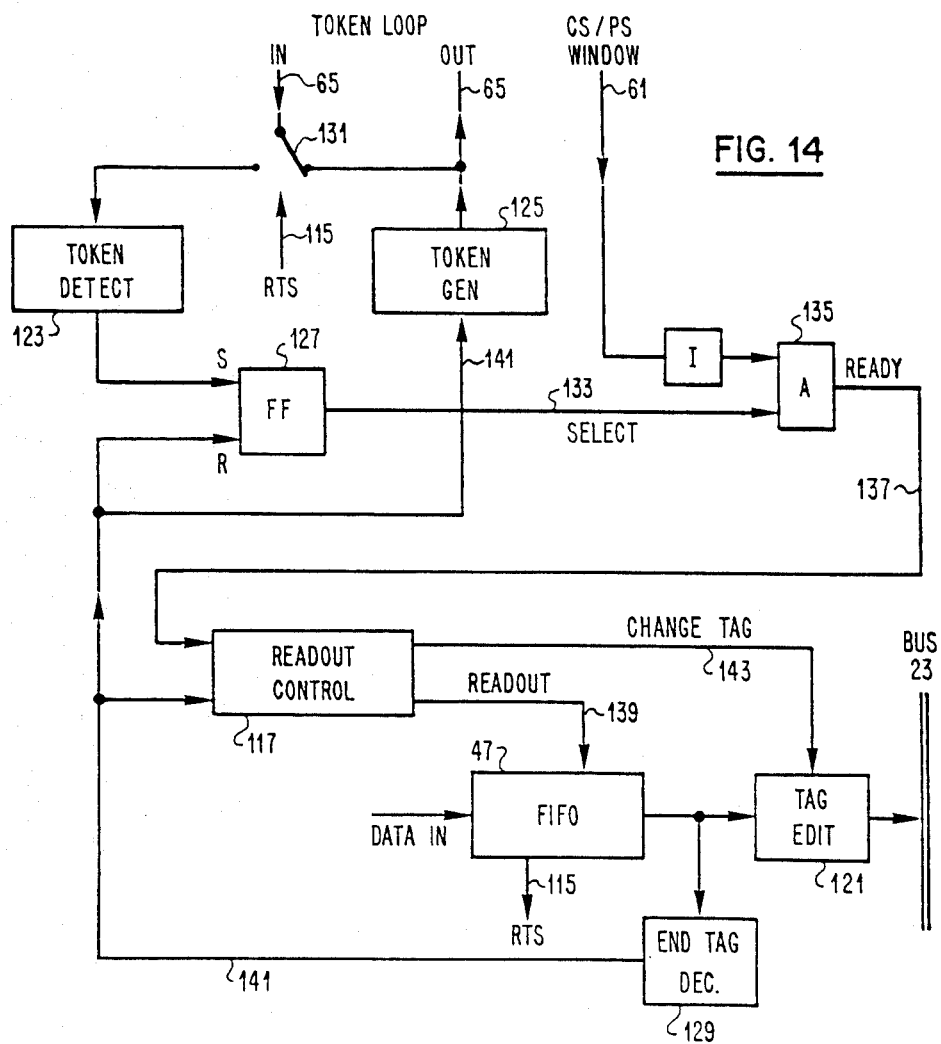
FIG. 14 is a block diagram of the circuitry for readout of PS data packets from FIFO buffers.

FIG. 14 shows the circuitry by which readout of the PS FIFO buffer 47 in a PS input port unit 17A (or in a mixed input port unit 19A) is controlled during the PS window portion of a frame. It comprises readout control circuitry 117, tag editing circuitry 121, a token detector 123, a token generator 125, a latch 127, and an end tag decoder 129. The incoming token loop line 65 is connected by a switch 131 either directly to the outgoing token loop line 65, or to the token decoder 123. The switch responds to a request-to-send (RTS) signal on line 115 which is activated when a data packet was received in the PS FIFO buffer 47 of the respective unit. When no RTS signal is active, any token is directly passed on to the next PS input port unit.

However, if RTS is active and a token is received in token detector 123, latch 127 is set and furnishes a select signal on line 133. This select signal is passed on through an AND gate 135 as a ready signal on line 137 to readout control means 117 only when the CS/PS window indicator signal on line 61 indicates that a PS window is open. Readout control circuitry 117 then activates a readout control signal on line 139 which starts a readout operation for the FIFO buffer 47. If no interruption occurs, a whole packet (lead by a two-byte local routing address) is transferred to data bus 23. When an end tag (11) is detected by end tag decoder 129, latch 127 will be reset by a signal on line 141, and the select, ready, and readout signals on lines 133, 137, 139 will be deactivated thus ending the readout process. Simultaneously, token generator 125 is activated and will transmit a token on outgoing loop line 65 to the next PS input port unit.

If, during packet transmission, the PS window is closed to allow start of a new frame, an interrupt procedure occurs: Due to a change in the CS/PS window indicator signal on line 61, the ready signal on line 137 is deactivated. The readout control circuitry will then deactivate the readout signal on line 139 when the next byte is read out, and cause tag editing circuitry 121 by a control signal on line 143 to append an intermediate end tag (10) to the last byte transferred. The token, however, is kept by the respective PS input port unit (latch remains set).

When, after the CS transmission period, the PS window is opened again (change of signal on line 61) the ready signal on line 137 will be activated again; readout control circuitry 137 will reactivate the readout signal on line 139, and because it had not yet received an end tag indication on line 141, it will cause tag editor 121 to append to the first byte of the second portion of the packet another start tag (01) instead of the normal tag (00).

The intermediate end tag (01) will cause the receiving PS output port unit 17B (shown in FIG. 1) to go into a wait state, thus interrupting reception of bytes from the data bus 23, and to resume reception when the PS window is opened again (signal on line 61), and when it receives from the data bus 23 a data byte having the start tag. Only when the receiving PS output port unit 17B detects a final end tag (11) it will stop the receiving procedure.

The end of a packet transmission in the sending PS input port unit 17A (shown in FIG. 1) is the same for interrupted packets as for uninterrupted packets (described above).

6. MULTIPLE BUS EXPANSION OF THE SWITCH

Figure 15:
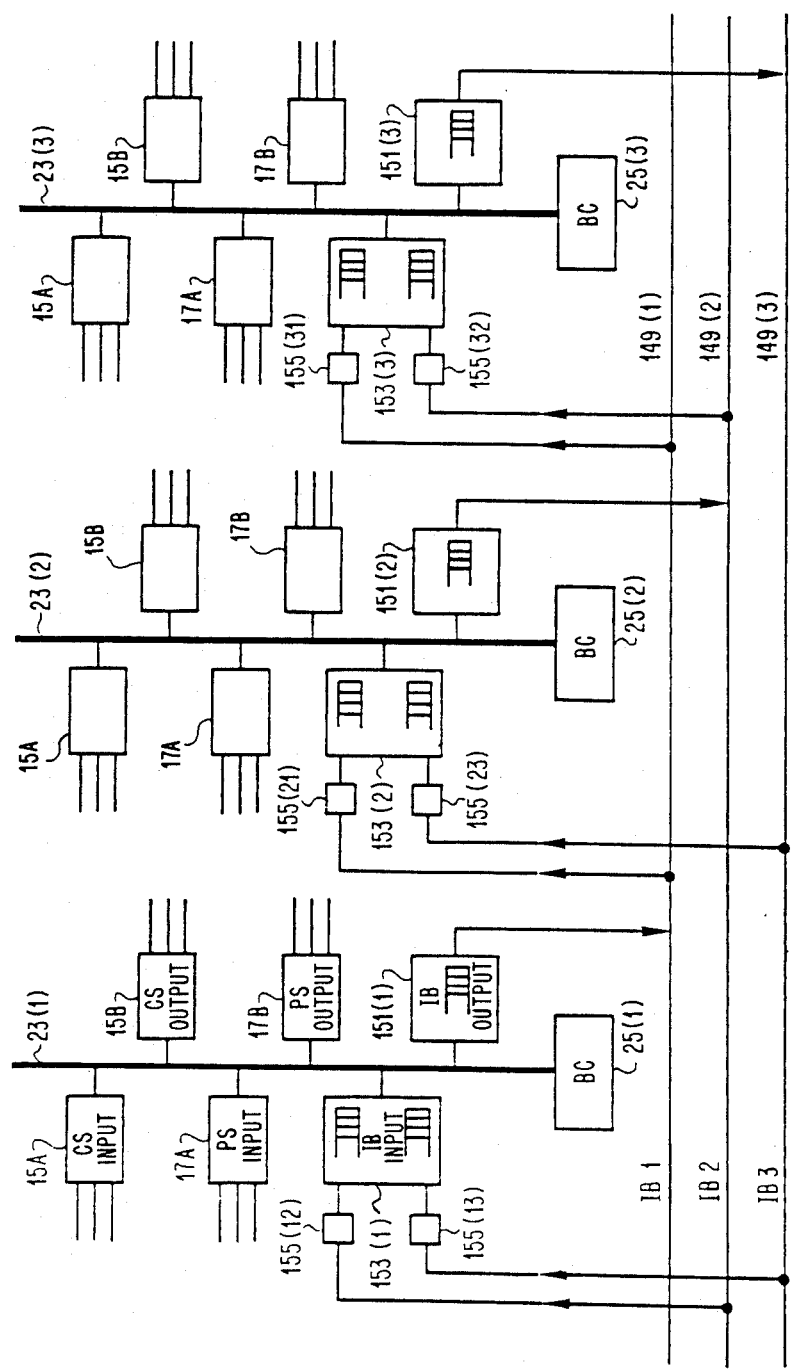
FIG. 15 is a schematic representation of a multiple bus extended exchange configuration.

Several exchange units, such as the one described so far, can be interconnected by multiple busses, as shown in FIG. 15. Interbusses IB 1, IB 2, IB 3, etc., are provided, one for each exchange unit, for carrying traffic from the respective exchange unit to the other exchange units.

Each of the exchange units has to be equipped with a special IB output port unit 151(*i*) for transferring the traffic from the local bus 23(*i*) to the interbus IB(*i*), and with a special IB input port unit 153(*i*) for transferring the traffic from all other interbusses to the local bus 23(*i*). If there are n exchange units in total, there will be n interbusses, and each IB input port unit 153(*i*) is connected to (n−1) interbusses by (n−1) IB selector gates 155(*ij*).

Furthermore, local routing addresses used in the exchange units must be extended to have three local routing address bytes, i.e., one extra local address byte for designating the exchange unit to which the respective minipacket is to be transferred.

More details will now be explained with reference to the example shown which has altogether three exchange units. In particular, the interbus traffic from and to exchange unit 1 will be described.

IB output port unit 151(*l*) has an address decoder, gating circuit, and FIFO buffer equal to those shown in FIG. 3 for CS output port unit 15B, but no demultiplexer/disassembler. When CS minipackets are transferred over the local bus 23(*l*), the address decoder and gating circuit will transfer all minipackets destined for another exchange unit to the FIFO buffer of IB output port unit 151(*l*). Contents of this FIFO buffer is continuously read out directly to interbus IB 1 as a serial stream of bytes. Local routing addresses and the two-bit tags are not stripped off in the IB output port, they are transferred over the interbus to the other exchange units. Thus, the interbusses have 10 parallel bit lines as the local busses.

IB input port unit 153(*l*) has two FIFO buffers and for each of them associated access control and readout circuitry, as shown for the normal CS input port units 13A in FIG. 10. (In the general case, there would be (n−1) FIFO buffers, each with associated circuitry). Each of the two IB selector gates 155(12) and 155(13) sees all the minipackets which appear on the interbus to which it is connected, but will gate only those minipackets into its connected FIFO buffer in the IB input port unit 153(*l*) which have a local routing address byte designating the own exchange unit 1. Thus, minipackets are collected in the FIFO buffers as it is done in the normal CS input port units. The IB selector gates contain an address decoder and a gating circuit as shown for the CS output port units 15B in FIG. 3.

The readout control means for the FIFO buffers in IB input port unit 153(*l*) are both connected into the daisy chain line 63 which is anyway connected to all normal input port units having CS input FIFO buffers. Thus, in the CS portion of each frame period, first all normal CS input FIFO buffers are read to (each up to the next CS end tag), and then the two FIFO buffers of the IB input port are read out in the same way, so that their contents is transferred to the different output port units connected to local bus 23(*l*), according to their local routing addresses.

The preferred embodiment uses electrical wire busses as the means to transfer data within the exchange, and single byte start and end tags. However, the alternative embodiments described below disclose other means for transferring data within the exchange, and dual start and end tags.

(A) Optical Bus Arrangement

The use of electrical wire busses for exchange equipment is well known in the art. In addition to electrical wire busses, which were disclosed in the preferred embodiment, this alternative embodiment provides optical fiber busses. In this case, the data transfer on the busses are all bit-serial, (i.e., not ten bits in parallel as shown for the electrical busses). This requires that either the FIFO buffers be bit-serial (one bit wide), or that serializers and deserializers are provided at the outputs and inputs of the FIFO buffers. Furthermore, electrical/optical converters have to be provided at each interface between a bus and an input port unit or output port unit. The advantage of the optical bus solution is the extremely high transmission speed which can be achieved.

(B) Serial Interbusses

If the distances between the exchange units in a multiple bus system (FIG. 15) are large, it would be desirable to have single-wire interbusses for bit-serial transmission instead of the ten-wire interbusses for byte-parallel transmission. In this case, a serializer must be provided at each IB output port unit 151, and a deserializer must be provided at the input of each IB selector gate 155.

(C) Separate Start and End Bytes

In the preferred embodiment, a start to the first local address byte of each minipacket (or PS packet), and an end tag is attached to the last byte of each minipacket (or PS packet). As an alternative, provided is an extra byte for attaching the start tag, and an extra byte for attaching the end tag. The eight bits of such extra bytes could be a special pattern. For example, a repetition of the attached tag: for a start tag 01, the associated byte is 01010101, and for an end tag 11 the associated byte is all ones. This solution requires some of the buffer and bus transmission capacity, but it enhances reliability because of the increased checking possibilities, and because more time is available for switching operations at the beginning and end of minipackets (or PS packets).

While the invention has been described with respect to a preferred embodiment thereof, it will be understood by those skilled in the art that various changes in detail may be made therein without departing from the spirit, scope, and teaching of the invention. For example, the buffer management and bus scheme disclosed herein could be emulated in computer storage by a computer program. Accordingly, the invention herein disclosed is to be limited only as specified in the following claims.

We claim:

1. Apparatus for concurrently connecting first input communication lines carrying circuit switched synchronous information traffic to first output communication lines carrying circuit switched synchronous information traffic, and second input communication lines carrying packet switched asynchronous data packets to second output communication lines carrying packet switched asynchronous data packets, said apparatus comprising:

circuit switched input buffers connecting to said first input communication lines;

circuit switched output buffers connecting to said first output communication lines;

packet switched input buffers connecting to said second input communication lines;

packet switched output buffers connecting to said second output communication lines;

a bus arrangement interconnecting the output of all said input buffers to the input of all said output buffers, including at least one data bus line for transferring data and addresses, at least one circuit switched access control line for the circuit switched input buffers, and at least one packet switched access control line for the pocket switched input buffers;

first control means for each circuit switched input buffer, for accumulating minipackets of synchronous information received on associated input lines assembly for each destination output line and for storing them in the respective circuit switched input buffer; for attaching a local routing address to each minipacket; and for attaching an end indicator to the last minipacket stored in the circuit switched input buffer in each time frame period;

second control means for each circuit switched input buffer for sequentially reading out, in response to an active signal on said circuit switched access control line, minipackets from said circuit switched input buffer onto said data bus lines until a minipacket with an end indicator is detected; and for changing the control signal on said circuit switched access control line so that the next circuit switched input buffer in a predetermined sequence receives an active signal on said line;

third control means for activating a window indicator signal when all said circuit switched input buffers are read out in response to a control signal on said access control line; and fourth control means for each said pocket switched input buffer, for transmitting in response to the reception of an access authorization on said packet switched access control line, a data packet with a local routing address onto said data bus lines, or for resuming a previously interrupted data packet transmission in response to said window indicator signal.

2. Apparatus as in claim 1, wherein said bus arrangement includes a circuit switched/packet switched window indicator line connected to said third control means and to each of said fourth control means.

3. Apparatus as in claim 1, wherein said bus arrangement includes a controller provided for releasing a daisy-chain signal on said circuit switched access control line at the beginning of each time frame period, and for releasing an access token on said packet switched access control line when said window indicator signal is activated, if no data packet transmission interruption occurred in the last frame period.

4. Apparatus as in claim 3 wherein said circuit switched access control line and said packet switched access control line each form a closed loop beginning and ending in said controller; said circuit switched access control line being sequentially connected to all second control means, and said packet switched access control line being sequentially connected to all fourth control means.

5. Apparatus as in claim 1 wherein said circuit switched input buffers and said circuit switched output buffers are first-in first-out buffers for sequential storage of bit-parallel bytes.

6. Apparatus as in claim 1 wherein each said first control means further comprises means for attaching a plural-bit tag to each byte which is stored into the associated circuit switched input buffer, one of said tags being said end indicator, and another one of said tags being an indicator for the start of a minipacket.

7. Apparatus as in claim 1 wherein said fourth control means further comprises:

means for entering a wait state when a data packet transmission must be interrupted at the end of a data packet transmission window, and;

means for attaching an intermediate end indicator to the end of the first portion of the interrupted packet, and;

means for attaching a start indicator to the beginning of the second portion of an interrupted packet when the data packet transmission is resumed.

8. Method of transferring information between circuit switched communication channels carrying synchronous information traffic and packet switched communication channels carrying asynchronous data packet traffic, in a switching exchange comprising input buffers and output buffers with associated control circuitry for first-in first-out sequential storage of traffic from said circuit switched channels, and input buffers and output buffers with associated control circuitry for storage of traffic from said packet switched channels, all said buffers being interconnected by a bus arrangement for transferring information packets in periodic time frames, said method comprising the steps of:

(a) collecting information arriving in each circuit switched input channel in a separate minipacket per given time unit, attaching to each minipacket a local address designating at least the circuit switched output buffer to which the information is to be transferred;

(b) storing in each circuit switched input buffer sequentially the minipackets for all circuit switched input channels associated to it, attaching an end indicator to the last minipacket stored in the respective buffer in each time frame period; and (c) once per time frame period:
in a circuit switched readout process, sequentially reading out to said bus arrangement, from each of said circuit switched input buffers, all minipackets with their local addresses, up to the next minipacket with an end indicator; and
then starting a window for data packet transmission between packet switched buffers through said bus under a predetermined arbitration scheme.

9. The method as in claim 8, wherein step (c) further includes:

when starting said data packet transmission window, either selecting said packet switched input buffers for transferring a data packet under a predetermined arbitration scheme, or resuming a previously interrupted data packet transmission; and closing said data packet transmission window and temporarily interrupting any data packet transmission in progress for starting the next time frame period.

10. The method as in claim 8, further comprising the step of:

storing information arriving in packet switched input channels, in said packet switched input buffers in the form of data packets as received, and attaching a local address to each data packet, designating at least the packet switched output buffer to which said data packet is to be transferred.

11. The method as in claim 8, further comprising the step of:

attaching a plural-bit tag to each information byte in each minipacket when storing it into a circuit switched input buffer, for uniquely designating the start and end of each minipacket and the last byte of the last minipacket stored in a circuit switched input buffer within any time frame period.

12. The method as in claim 8, further comprising the steps of:

starting a circuit switched readout process for sequentially reading out minipackets from all circuit switched input buffers in a predetermined sequence, at the beginning of each time frame period, by transferring a daisy-chain signal to the control circuitry of the first circuit switched input buffer in said sequence;

furnishing a daisy-chain signal from the control circuitry of each circuit switched input buffer, when finishing minipacket readout at occurrence of the end indicator, to the control circuitry of the next circuit switched input buffer in said sequence, until the control circuitry of the last circuit switched input buffer in said sequence furnishes a daisy-chain signal indicating the end of the circuit switched readout process; and starting a data packet transmission window in response to the daisy-chain signal from the control circuitry of said last circuit switched input buffer.

13. The method as in claim 12, further comprising the step of:

furnishing a binary circuit switched/packet switched window indicator signal at least to the control circuitry of all packet switched input and output buffers, said signal assuming its one binary value at the beginning of each time frame period when the circuit switched readout process is started, and changing to its other binary value when the end of the circuit switched readout process is indicated and the data packet transmission window is started.

14. The method as in claim 12, further comprising the steps of:

providing a token access procedure for access arbitration between the control circuitry of all packet switched input buffers in a predetermined sequence;

starting a data packet transmission process at the beginning of the data packet transmission window by either releasing an access token to the control circuitry of the first packet switched input buffer in said sequence, or by resuming an interrupted packet transmission between a pair of packet switched buffers for which the packet transmission was interrupted, in response to a change in the circuit switched/packet switched window indicator signal.

15. The method as in claim 8, further comprising the step of:

interrupting, when the data packet transmission window starts, any ongoing packet transmission from a packet switched input buffer over the bus to a packet switched output buffer, and setting the control circuitry of the transmitting packet switched input buffer and of the receiving packet switched input buffer into a wait state.

16. The method as in claim 15, further comprising the step of:

appending a particular tag to the last byte of the first portion of an interrupted data packet indicating an intermediate end, and appending a start indicating tag to the first byte of the second portion of an interrupted data packet when the transmission is resumed.

17. The method as in claim 8, wherein the attached local address has at least two portions, one portion designating the output buffer to which the minipacket or data packet is to be transferred, and the other portion designating one of several output channels which are connected to the respective output buffer, and that these address portions are also stored in the respective output buffer.

18. The method as in claim 10, wherein the attached local address has at least two portions, one portion designating the output buffer to which the minipacket or data packet is to be transferred, and the other portion designating one of several output channels which are connected to the respective output buffer, and that these address portions are also stored in the respective output buffer.

* * * * *

UNITED STATES PATENT AND TRADEMARK OFFICE
CERTIFICATE OF CORRECTION

PATENT NO. : 4,862,451

DATED : August 29, 1989

INVENTOR(S) : Felix H. Closs et al

It is certified that error appears in the above-identified patent and that said Letters Patent is hereby corrected as shown below:

Col. 15, line 1   Delete "pocket" and insert therefor --packet--.
Col. 15, line 6   Delete "assembly" and insert therefor --separately--.
Col. 15, line 26  Delete "pocket" and insert therefor --packet--.

In the Abstract:
Title page, line 17, Delete "and" and insert therefor --any--.

Signed and Sealed this

First Day of October, 1991

Attest:

HARRY F. MANBECK, JR.

Attesting Officer

Commissioner of Patents and Trademarks